United States Patent
Rode

[11] 3,900,232
[45] Aug. 19, 1975

[54] ARRANGEMENT FOR PRELOADING BEARINGS

[75] Inventor: John E. Rode, Fonda, N.Y.

[73] Assignee: Temper Corporation, Fonda, N.Y.

[22] Filed: Sept. 26, 1973

[21] Appl. No.: 401,117

[52] U.S. Cl............ 308/1 R; 29/149.5; 308/189 R
[51] Int. Cl. ............................................ F16c 35/06
[58] Field of Search............ 308/189 R, 189 A, 190, 308/1 R, 207 R, 207 A, 20 B, 227; 29/149.5, 148.4

[56] References Cited
UNITED STATES PATENTS

| | | | |
|---|---|---|---|
| 2,374,820 | 5/1945 | Kaye.................................. | 308/231 |
| 3,006,700 | 10/1961 | Hoffmann................... | 308/189 R X |
| 3,211,060 | 10/1965 | McCann......................... | 308/207 R |
| 3,352,611 | 11/1967 | Seidel............................... | 308/189 |

*Primary Examiner*—M. Henson Wood, Jr.
*Assistant Examiner*—Gene A. Church
*Attorney, Agent, or Firm*—Melvin A. Crosby

[57] ABSTRACT

An arrangement for preloading a pair of axially spaced thrust sustaining antifriction bearings which are interposed in tandem between a pair of members in which one race of each bearing is abutted on one side by abutment means stationary on one of the members, while moveable abutment means on the other member are arranged in opposed relation to the other sides of the other races of the bearings. Load elements are interposed between the other races of the bearings and the moveable abutments and adjusted to compress the load elements axially and thereby exert a predetermined preload on the bearings. A feature of the present invention resides in the specific load elements and each of which is arranged so that axial compression thereof will cause the load element to undergo a first period of resilient deformation at increasing compressive force followed by a second period of plastic deformation at substantially constant compression force. In applying the preload to the bearings, the load elements are first compressed within the range of plastic deformation thereof and are then clamped in place between the bearings and the abutments therefor in a condition of resilient deformation. Precise and accurate preloading of the bearings can thus be accomplished without the necessity of resorting to expensive, highly accurate machining of the members in respect of the bearing engaging surfaces thereof.

28 Claims, 15 Drawing Figures

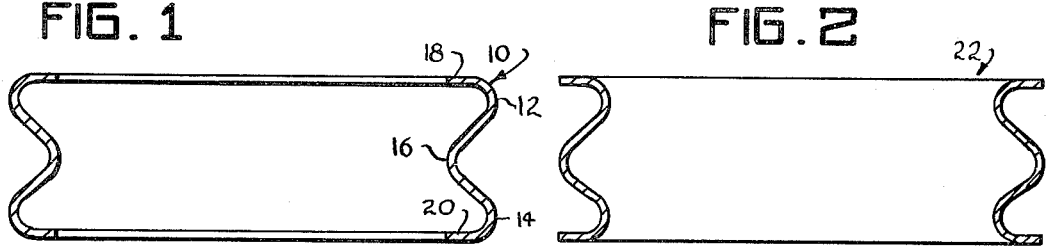
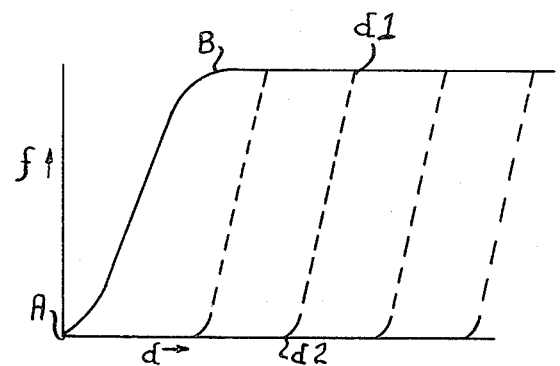
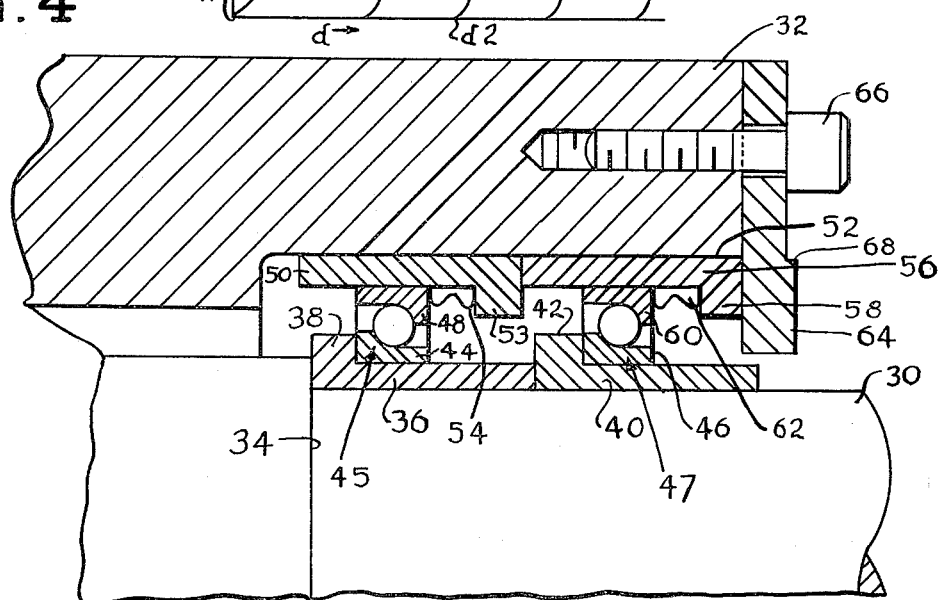
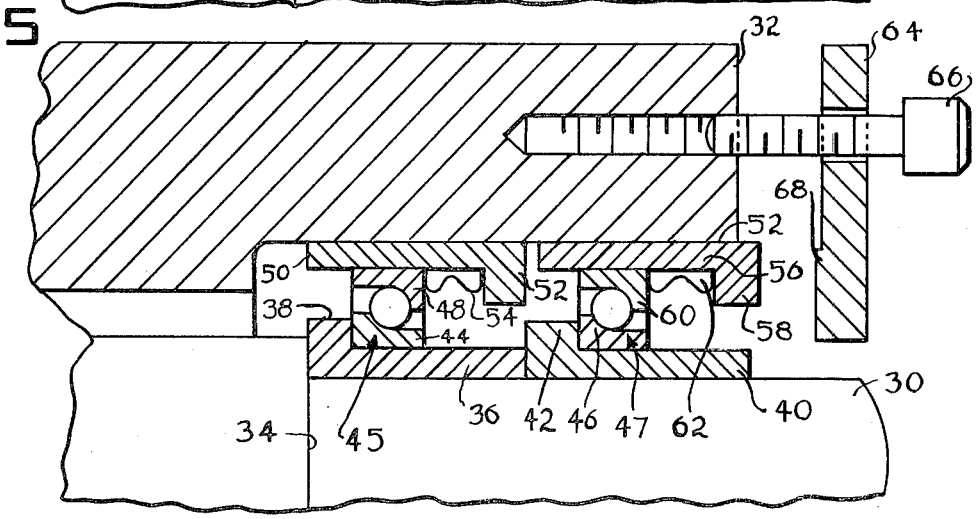

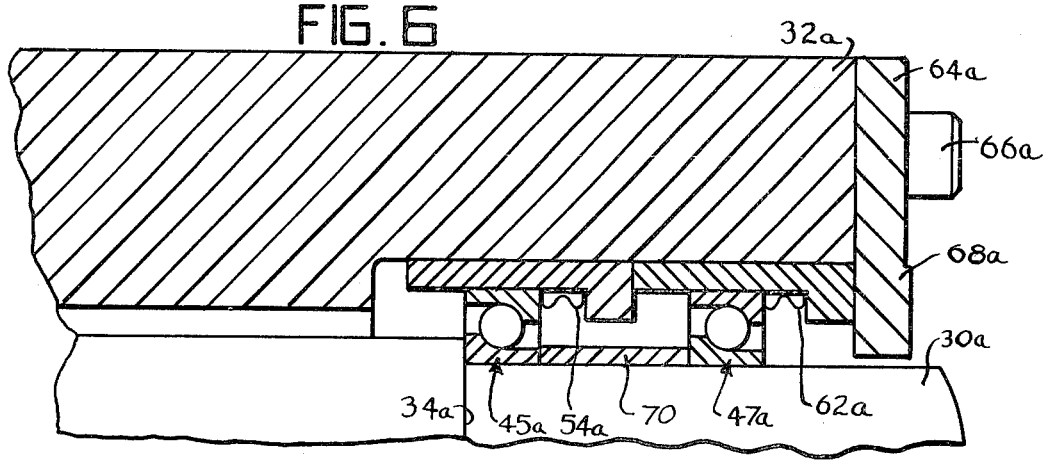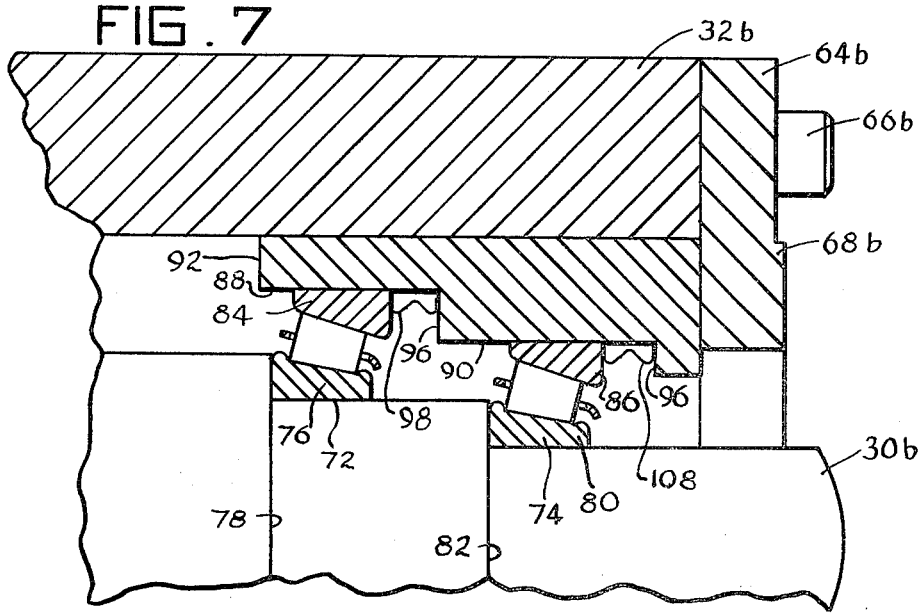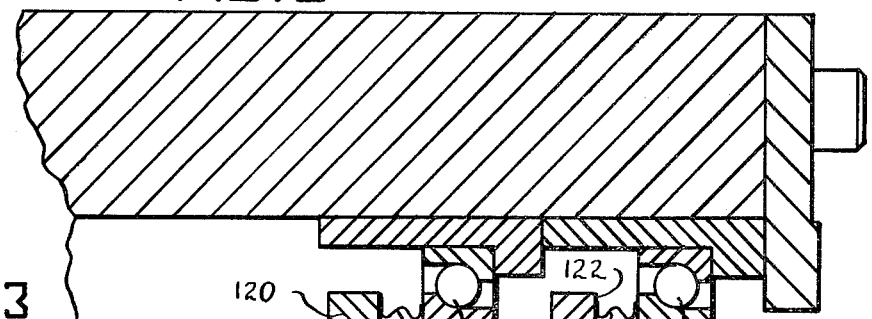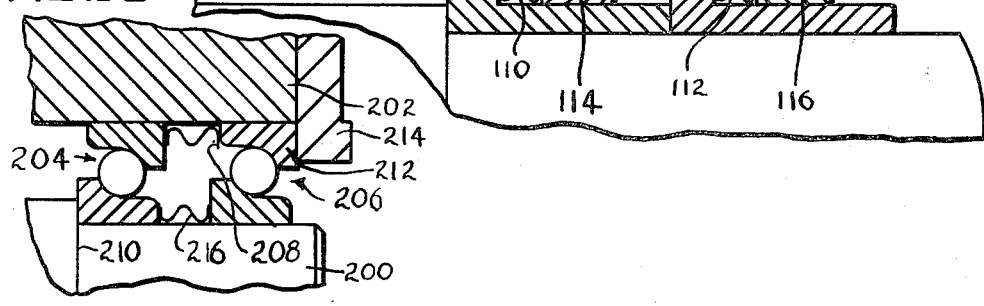

ARRANGEMENT FOR PRELOADING BEARINGS

The present invention relates to bearing arrangements and to the preloading thereof, and is particularly concerned with an arrangement for preloading axially spaced thrust sustaining antifriction bearings in a highly accurate manner.

Bearings are ordinarily imposed between relatively rotatable parts and, quite frequently, the interposed bearings are in the form of antifriction bearings. It is also normal for bearings interposed between relatively rotatable parts to be required to sustain certain amounts of thrust. The thrust is required to hold the parts in predetermined axial positions, or to prevent relative axial movement of the parts in response to loading exerted therebetween during operation of the device in which the relatively rotatable members are embodied.

Bearings of the aforesaid nature are advantageously axially preloaded to a certain amount to insure proper performance thereof and to prevent the bearings from being damaged which could come about if the bearings were free to move axially, or were preloaded axially to an excessive degree.

The load requirements in situations referred to above are often such that rather large bearings are required. Large bearings are relatively expensive and, in many cases, an economy could be realized if a single large bearing could be replaced by two, or more, smaller bearings having the same total load capabilities of the single large bearing. Furthermore, space requirements for two smaller bearings are ordinarily less than is required for a single large bearing.

When a single large bearing is employed, the preloading thereof in the axial direction represents no particular difficulties but when two or more bearings are used to replace a single large bearing, the smaller bearings are disposed in axially spaced relation and accurate preloading thereof so axial loads are distributed properly between the bearings becomes a problem. As mentioned above, however, accurate preloading of the bearings to obtain the most efficient operation and the maximum life is important.

With the foregoing in mind, a primary objective of the invention is the provision of devices for and a method of preloading bearings interposed between relatively rotatable members.

A further object is the provision of devices for and a method of preloading multiple bearings interposed between relatively rotatable members in such a manner that each individual bearing has the proper preload exerted thereon.

A still further object of the present invention is the provision of devices for and a method of preloading bearings interposed between relatively rotatable members, especially multiple bearings, in which axially collapsible load element devices are employed which eliminate the need for extremely accurate machine work on the relatively rotatable members to support and locate the bearings therebetween.

BRIEF SUMMARY OF THE INVENTION

According to the present invention, first and second relatively rotatable members which may be, for example, in the form of a nonrotatable housing and a shaft rotatable therein, have axially spaced tandem bearings supportingly interposed therebetween. The bearings are preferably of the thrust sustaining anti-friction type and may consist of thrust bearings in combination with at least one radial bearing, or may consist of the type of antifriction bearings which will sustain both radial and axial loads.

In any case, the thrust sustaining bearings are disposed in axially spaced relation between the relatively rotatable members and each has one race abutted by abutment means stationary on one of said members, while the other races are arranged in opposed relation to movable abutment means carried by the other member.

According to the present invention, axially compressible load elements are interposed between each of the other races in the moveable abutment means therefor, and the movable abutment means are then adjusted on the aforesaid other member and clamped in place thereon with the load elements in a predetermined state of axial compression, such that the required preload is imparted to each of the bearings.

In particular, each load element is in the form of a ring which, when collapsed in the axial direction from a free length, undergoes a first period of resilient deformation during which the compressive force on the ring rises linearly, and then commences to deform plasticly during a second period and during which the compressive force on the ring remains substantially constant. The ring, upon the release of the compressive forces acting thereon will spring back the amount of the resilient compression thereof. Thus, in order to preload the bearings, the load elements are first compressed to within the range of plastic deformation thereof and the moveable abutment means are then adjusted to compress each load ring to a desired degree within the range of resilient deformation thereof and the moveable abutment means are then clamped to the member to which they pertain.

By selecting the load elements to be slightly longer than the length which they will have when clamped in place, assembly of the load elements with the bearings becomes a relatively simple matter. The bearings are first interposed between the relatively moveable members with the load elements and the moveable abutment means in position, and the moveable abutment means are then moved in a direction to compress the load elements axially into the range of plastic deformation and thereafter the moveable abutment means are retracted from the advanced position thereof and are clamped to the pertaining member with the load rings simultaneously relaxing to within the range of resilient deformation thereof.

The result is that the bearings can easily and quickly have the desired preload imposed thereon and without the necessity of observing any extremely close machining tolerances in respect of the parts between which the bearings are confined.

The exact nature of the present invention and the manner in which the objects referred to above are achieved will become more apparent upon reference to the following detailed specification taken in connection with the accompanying drawings, in which:

FIG. 1 shows a load element of one type that can be employed in connection with the present invention.

FIG. 2 shows a load element similar to FIG. 1, but of a different configuration.

FIG. 3 is a graph showing the manner in which either of the load elements of FIGS. 1 and 2 deform when axial compressing forces are applied thereto.

FIG. 4 is a fragmentary view showing bearings interposed between a shaft in a housing and preloading according to the present invention.

FIG. 5 is a fragmentary view of the arrangement of FIG. 1 showing a step carried out during the assembling thereof.

FIG. 6 is a fragmentary sectional view similar to that of FIG. 4, but showing a slightly different arrangement.

FIG. 7 is a fragmentary sectional view similar to FIG. 4, but showing roller type bearings rather than ball bearings.

FIG. 8 is similar to FIG. 1, but showing a different manner of using the load elements to obtain the desired preload.

FIG. 13 shows a modification.

BRIEF DESCRIPTION OF THE INVENTION

Figure 9:
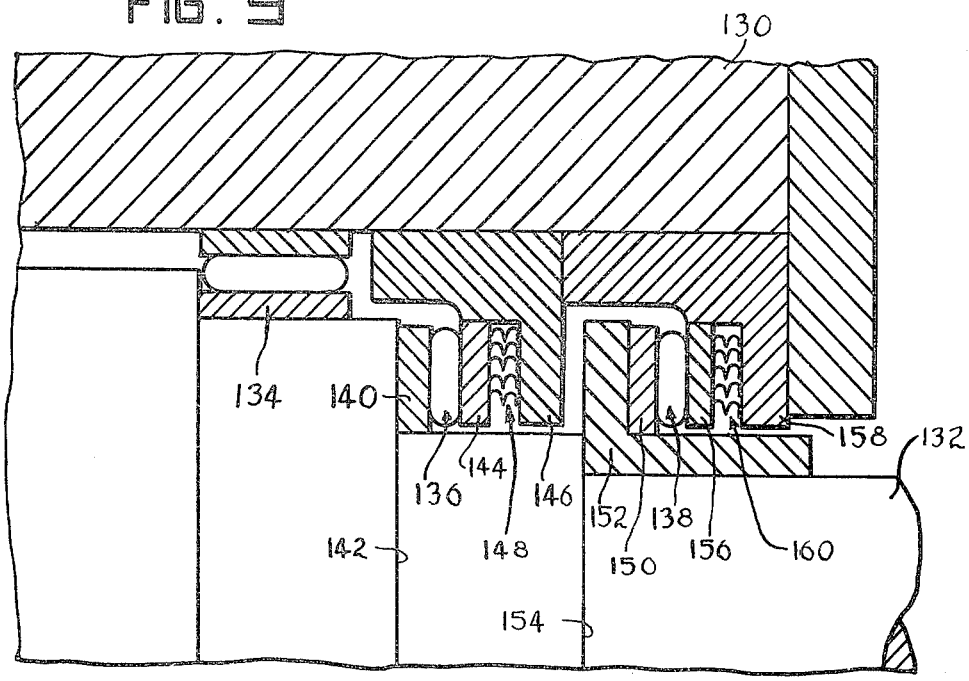
FIG. 9 is a fragmentary sectional view showing the combination of a radial bearing with a pair of axially displaced thrust bearings, with the thrust bearings preloaded by load elements according to the present invention.

Referring to the drawings somewhat more in detail, FIGS. 1 and 2 show annular load elements of substantially the same type as illustrated in eith of my copending applications:

Ser. No: 841,352 — filed: July 14, 1969 entitled: STATIC SEAL WITH FOIL LAMINATE (Now U.S. Pat. No. 3,595,588)

Ser. No: 181,219 now abandoned filed: Sept. 16, 1971 entitled: DEFORMABLE METALLIC ELEMENT The load element 10 in FIG. 1 comprises a strip of metal rolled into a ring form and convoluted in cross section. The ends of the strip may be joined together, or left free of one another. The ring of FIG. 1, for example, comprises the inwardly concave convolutions 12 and 14 near the ends and the outwardly concave convolution 16 in about the middle which is joined to convolutions 12 and 14. Convolution 12 has an outer leg 18 extending substantially radially inwardly and convolution 14 similarly has an outer leg 20 extending substantially radially inwardly.

The load element illustrated, when loaded by compressive forces acting thereon in the axial direction will undergo a first period of resilient deformation followed by a second period of axial deformation. During the period of resilient deformation of the load element, the compressive force acting thereon rises substantially linearly, whereas during the period of plastic compression of the load element, the compressive forces acting thereon remain substantially constant.

At any time the axial forces acting on the load element are released, the load element will spring back the amount of the resilient deformation thereof. This is brought out in the graph of FIG. 2, wherein axial force $f$ is plotted as the ordinate and deflection $d$ is plotted as the abscissa. Prior to the imposing of any axial force on the load element, it has a predetermined free length and the deflection is zero. The point pertaining to these conditions is marked A on the graph of FIG. 3.

If the load element now has a force applied thereto in the axial direction, the load element will commence to deform resiliently up to about the point B in the graph of FIG. 3; while, thereafter, the axial compression of the load element will take place at a substantially constant force.

At any given axial deflection, say, the point marked $d1$ on the graph of FIG. 3, release of the axial compressive force $f$ will result in resilient expansion in the axial direction of the load element to the point marked $d2$. Thus, the preload which such a load element will exert on the bearing race against which it is compressed in the axial direction can be determined quite accurately by first compressing the load ring axially to within the range of plastic deformation thereof and then permitting the load ring to spring backwardly to the desired point within the range of resilient deformation thereof.

Thus, by selecting a load element of about the proper length and first compressing the load element to a predetermined greater amount than it will be compressed when finally assembled with the bearing, the preload which the load element will exert on the bearing can be precisely predetermined without observing extremely close machining tolerances in respect of the bearing support.

The load element of FIG. 2, indicated at 22, is the same as the load element of FIG. 1, except that the axially outermost convolutions are concave outwardly, while the inner convolution is concave inwardly. In performance, the load element of FIG. 2 is exactly the same as that of FIG. 1.

Turning now to FIGS. 4 and 5, an actual representation of the manner in which the present invention is practiced is illustrated. In these Figures, 30 represents a shaft and 32 represents a housing in which the shaft is rotatable. Shaft 30 has a shoulder 34 thereon which abutts one end of a first sleeve 36 having a radial abutment 38, with sleeve 36 being abutted at the end opposite abutment 38 by a second sleeve 40 also having an abutment 42. Abutment 38 abuts one end of inner race 44 of an antifriction ball bearing 45 configured to sustain both axial and radial thrusts, while abutment 42 engages inner race 46 of a second antifriction bearing 47 axially spaced from the first mentioned bearing, and also in the form of a ball bearing adapted for sustaining both radial and axial forces.

The other race 48 of the first mentioned bearing is disposed in a sleeve 50 slidably mounted in cylindrical bore 52 of member 32. Sleeve 50 has an abutment region 53 formed thereon in opposed relation to race 48 and on the opposite side of 48 from the side of race 44 abutted by shoulder 38 on sleeve 36. Interposed between the abutment region 53 of sleeve 50 and race 48 is a load element 54 of the type shown in FIG. 2 and described above.

Abutting the right end of sleeve 50, as it is viewed in FIG. 4, is a second sleeve 56 which also has an abutment region 58 thereon in spaced relation to the right side of outer race 60 of the other antifriction bearing and between which race and the abutment region 58 is disposed a further load element 62 of the same type as load element 54. Finally, the right end of sleeve 56 is abutted by a clamp ring 64 which is fixedly clamped to the end of member 32 by clamp screw means 66.

The desired preload on the bearings is obtained in the manner schematically illustrated in FIG. 5. In FIGS. 4 and 5, it will be noted that one side of clamp ring 64 has a raised region 68 thereon. This raised region is of a predetermined thickness so that when the bearings and sleeves are first assembled between shaft 30 and member 32, the clamp member is placed on member 32 with the raised portion 68 directed inwardly and is then clamped in place on the end of member 32. When the clamp ring is thus clamped in place, the sleeves 50 and 56 will be thrust toward the left and the load elements 54 and 62 will be compressed in the axial direction to within the range of plastic deformation thereof.

Thereafter, the clamp member is removed from the end of member 32 and is reversed to its FIG. 4 position and is again fixed to the end of member 32. The raised portion 68 is so selected as to height that following the initial compressing step on the load elements, when the clamp member is again fixed to member 32 in its FIG. 4 position, the load elements will be compressed to within the range of resilient deformation thereof, and to such a degree within the said range as to obtain the desired amount of preload on each bearing.

The bearings may have a small amount of end play if the environment is such that temperature conditions may cause axial expansion of the shaft. In such a case, the load elements will prevent the bearings from being overloaded.

At this point, it will be appreciated that no highly accurate machining of the bearing confining members is necessary in respect of axial distances, other than the height of the raised portion 68 because the nature of each of the load elements is such that variations in machining are automatically compensated and precisely the same preload is always exerted on the bearings. Thus, manufacture becomes economical and bearing preload becomes accurately predictable and improved results at reduced costs are obtained.

It will furthermore be apparent that instead of the raised portion 68, the clamp member 64 could first be bolted up tight against the member 32 to effect primary compression of the load elements and thereafter be replaced on the end of member 32 with a predetermined axial thickness of shims interposed between the clamp member and member 32.

FIG. 6 shows an arrangement quite similar to that of FIGS. 1 and 2, except that interposed between the axially spaced bearings 45a and 47a is a sleeve 70. The outer races of bearings 45a and 47a are supported in respective sleeves with load elements provided therefor in accordance with the showing in FIG. 4.

In FIG. 7, which bears the same numbers as employed in FIG. 4 with the addition of subscript b, where applicable, there is interposed between housing 32b and shaft 30b a pair of axially spaced bearings 72 and 74 which are in the form of tapered roller bearings. Inner race 76 of bearing 72 abutts a shoulder 78 formed on shaft 30b, whereas inner race 80 of bearing 74 abutts a shoulder 82 formed on shaft 70b.

Outer races 84 and 86 of bearings 72 and 74 are disposed in respective cylindrical recesses 88 and 90 formed in a sleeve 92 carried by housing 33b. Each cylindrical portion has a respective bottom wall 94, 96 and interposed between the bottom walls and the opposed ends of the outer races 84 and 86 are the load elements 98 and 100 according to the present invention. The assembly of the modification of FIG. 7 is the same as was described in connection with FIG. 4.

FIG. 8 shows a further arrangement similar to that of FIG. 4 except in the FIG. 8 arrangement the load elements, indicated at 110 and 112 are interposed between the races of the bearings 114 and 116 and the shoulders, or abutments, 120 and 122 formed on the sleeves on which the inner races are mounted. The outer races of the bearings 114, 116 in the FIG. 8 modification directly abutt the shoulder, or abutment regions, formed on the respective sleeves therefor. The assembly of the modification of FIG. 8 is the same as that shown in FIG. 4.

In FIG. 9, a housing 130 is provided in which is rotatable shaft 132. Interposed between shaft 132 and housing 130 is a radial bearing 134 and first and second axial thrust bearings 136 and 138, and which thrust bearings, as will be seen, may be of the same size. The one race 140 of bearing 136 pertains to shaft 132 and abutts a shoulder 142 formed on the shaft. The other race 144 of bearing 136 pertains to housing 130 and is fitted inside a shouldered sleeve 146 and between the shoulder of which and the said race 144 is disposed a load element 148 in the form of a plurality of coaxial nested load springs. Each load ring is of the type shown in either FIG. 1 or FIG. 2 of the drawings.

Bearing 138 has its race 150 which pertains to shaft 132 mounted on a shouldered sleeve 152 which engages shoulder 154 on the shaft while the race 156 of bearing 138 which pertains to housing 132 is received in a shouldered sleeve 158, which may be the same as shouldered sleeve 146 pertaining to bearing 136. As in connection with bearing 136, the load element 150 interposed between race 146 and the opposed shouldered sleeve 158 is made up of coaxial nested load elements, each of which is in the form of rings such as shown in either FIG. 1 or 2 of the drawings.

The assembly of the modification of FIG. 8 is the same as that shown in FIGS. 4 and 5, with the load elements being compressed to within the range of plastic deformation thereof and then relaxed to within the range of resilient deformation thereof.

Figure 10:
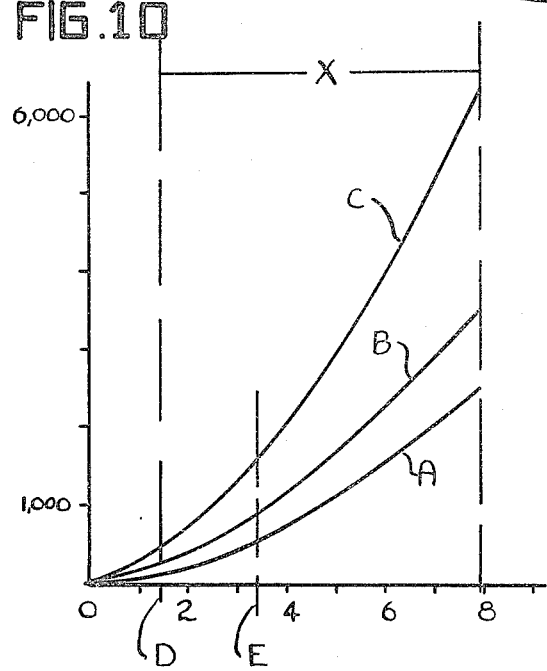
FIG. 10 is a graph explaining the operation of the arrangement of the present invention.

FIG. 10 shows actual conditions which might exist in an assembly having two load elements in series in an assembly and each of which load elements has first been compressed to within the plastic range and then relaxed to within the resilient range thereof. The graph of FIG. 10 shows the deformation of the load rings within the range of resilient compression thereof.

The deflection in mils is plotted as the abscissa and the compression force in pounds is plotted as the ordinate. The dimension X is that linear distance between the condition of maximum compression on the load elements when they are first assembled in the combination and the compression of the load elements when they are finally clamped in position. Thus, a compressive force of 6,000 pounds might be applied to the load elements, resulting in the load element for one bearing and pertaining to line A of the graph being loaded to 2,500 pounds, with the other load element for the other bearing and pertaining to line B of the graph being loaded to 3,500 pounds. At these loads, the rings are compressed into the range of plastic deformation thereof. Thereafter, upon permitting the load elements to relax and then clamping the load elements in position within the range of resilient compression thereof, say, as indicated by line D, the load elements will be compressed at about 200 and 300 pound loads respectively.

Under this relatively light preload, axial deflection of the shaft will result in axial force thereon according to the line marked C on the graph, with the load being distributed proportionally between the bearings pertaining to lines A and B.

For example, at a compression as indicated by line E, the load rings are further compressed within the resilient range with each bearing, as before, being preloaded to a predetermined amount relative to the other bearing.

It will be understood that the tandem bearings could be identical with identical load rings pertaining thereto, or the bearings could differ in size and the load rings, or load elements, pertaining thereto have characteristics in conformity with the respective bearing.

Figure 12:
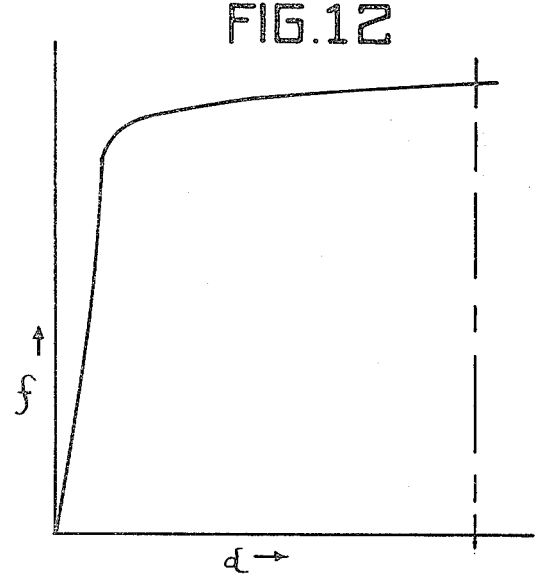
FIG. 12 is a load deflection curve pertaining to the load element of FIG. 11.
Figure 11:
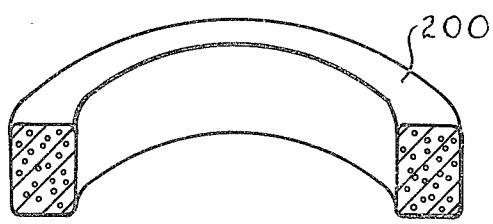
FIG. 11 is a sectional perspective view showing a modified type load ring that can be employed in the practice of the present invention.

FIG. 11 shows a load element in the form of sintered powdered metal ring which has only been compacted to a fraction of the theoretical density thereof, say, 50 to 75 percent of theoretical density. Such a ring is somewhat porous and can be compressed a substantial amount in the axial direction. The load deflection curve for the load element of FIG. 11 is illustrated in FIG. 12.

The ring will have some spring back which can be substantial by suitable selection of the metal powder, aluminum, for example, will give spring back of a readily measurable amount.

After the load elements have been compressed and then relaxed, they will act as springs. Bellville springs could be employed, for example, to give proportionate axial preloads on tandem bearings but the use of such springs would not have the advantage of automatically compensating for tolerances in the bearing supporting members at the time of assembly.

FIG. 13 shows relatively rotatable members 200 and 202 between which are bearings 204 and 206. One end of inner race 208 of bearing 204 engages shoulder 210 on member 200, while the opposite end of outer race 212 of bearing 206 engages clamp ring 214 connected to member 202. Load element 216 is interposed between the inner races of the bearings, while load element 218 is interposed between the outer races.

In assembly, the load elements are first compressed to within the range of plastic deformation and clamp ring 214 is then fixed in place with the load elements relaxed.

Thereafter, axial movement of member 200 toward the right is resisted via bearing 204, load element 218, outer race 212 of bearing 206 and clamp ring 214 and is also resisted via inner race 208 of bearing 204, load element 216, bearing 206, and clamp ring 214. The load imposed on the bearings is, then, divided therebetween.

While it is considered good practice to hold at least a small preload on the bearings, it is also possible, as mentioned above, to permit the load elements to relax to a free length before the assembly is clamped together and in this way the load elements would be under no compression.

A small amount of end play could even be provided for the bearing by properly adjusting the abutments for the load elements following retraction of the abutments after the initial compressions of the load elements into the range of plastic deformation thereof.

As also mentioned, such an arrangement, namely, one in which the load elements were completely relaxed, or provided with clearance at the ends, could be useful when the members supporting the bearings could be expected to undergo expansion due to heat or the like.

While the drawings show two rings in tandem between the relatively rotatable members, more than two could be employed, if desired.

Figure 14:
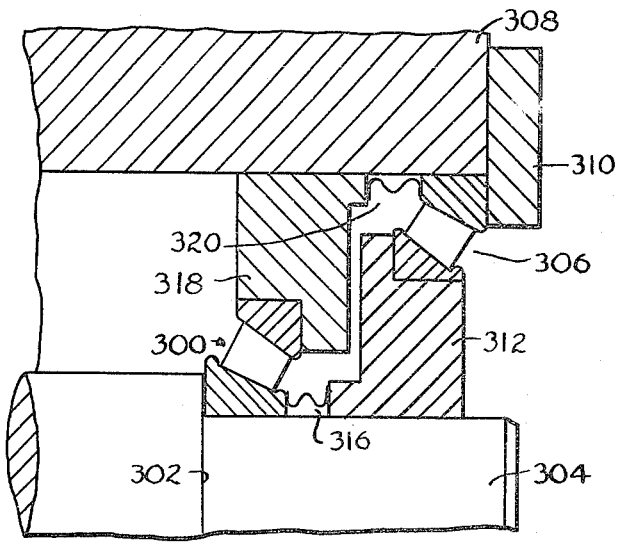
FIGS. 14 and 15 show modifications in which the bearings of each pair are of different sizes.

FIG. 14 shows a modified arrangement similar to that of FIG. 13, but wherein the bearings are of different diameters. A first bearing 300 has the inner race engaging shoulder 302 on shaft 304, while a second and larger bearing 306 has the outer race disposed in housing member 308 and engaged by clamp ring 310. The inner race of bearing 306 is mounted on and abuts a shoulder on a sleeve 312 slidable on shaft 304 and between which sleeve and the inner race of bearing 300 is load element 314 which pertains to bearing 306.

Similarly, the outer race of bearing 300 is mounted on and abuts a shoulder on a ring 318 slidably carried by housing 308 and between each ring and the outer race of bearing 306 there is disposed load element 320 pertaining to bearing 300.

From the foregoing, it will be seen that load element 316 is serially arranged between the inner race of bearing 306 and the outer race of bearing 300 so that the ring is effective in connection with bearing 306.

Similarly, ring 318 and load element 320 are serially arranged between the outer race of bearing 306 and the outer race of bearing 300 so the load element 320 cooperates with bearing 300.

As with the previous modifications, the load elements 316 and 320 are first compressed to within the range of plastic deformation thereof and are then allowed to spring back and are preferably confined so as to impart at least a light preload to bearings 300 and 306. Any axial deflection of shaft 304 will result in deflection of both of the load elements the same amount and will, thus, result in dividing of the axial load between the bearings. In the case of FIG. 14, bearing 306 is larger than bearing 300 and, accordingly, load element 316 is stiffer than load element 32 so that the division of the load between the bearings is in conformity with the respective load capacities thereof.

Figure 15:
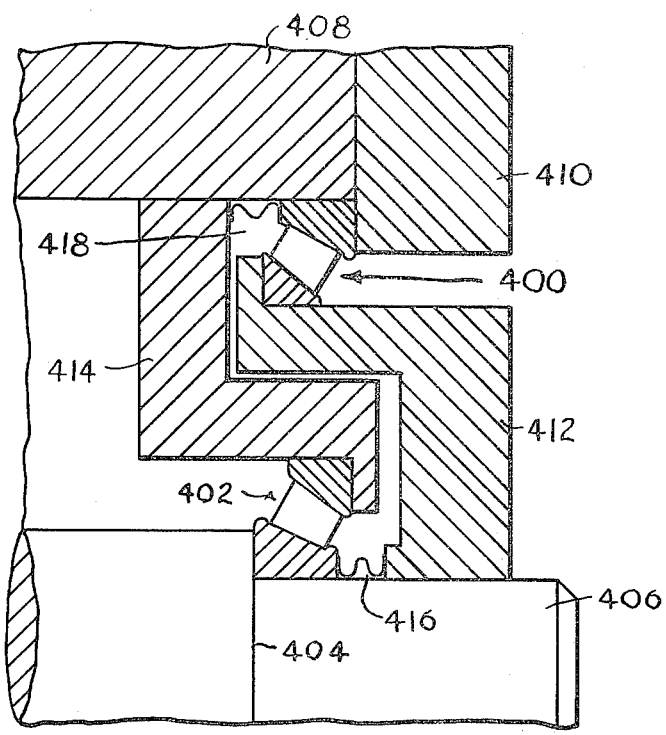

In FIG. 15, the larger bearing 400 is substantially coplanar with the smaller bearing 402. The inner race of bearing 402 engages shoulder 404 of shaft 406, while the outer race of bearing 400 is supported in housing 408 and is abutted by clamp ring 410. The sleeve member in FIG. 15, corresponding to the sleeve member 312 in FIG. 14, is indicated at 412, and is somewhat L-shaped, while, similarly, the ring corresponding to ring 318 of FIG. 14, is indicated at 414 and is also somewhat L-shaped.

In FIG. 15, load element 416 between the inner race of bearing 402 and sleeve 412 pertains to bearing 400, while load element 418 between the outer race of bearing 400 and ring 414 pertains to bearing 402.

As before, load element 416 pertaining to the larger bearing is preferably stiffer than load element 402 to provide for the proper distribution of axial loads between the bearings.

In assembly procedures, both of the modifications of FIGS. 14 and 15 would be substantially identical with assembly procedures previously described.

The modifications of FIGS. 14 and 15 have particular merit in respect of compactness, especially in the axial direction and also in respect of rotational stability.

Modifications may be made within the scope of the appended claims.

What is claimed is:

1. In combination; first and second relatively rotatable members, at least two thrust sustaining antifriction bearings interposed between said members in axially spaced relation and each bearing having first and second races pertaining to and nonrotatable relative to said first and second members respectively, first abutment means stationary on said first member and engaging one axial side of said first races, second abutment means axially slidable on said second member and in opposed relation to the other axial sides of said second races, axially compressible load element means interposed between said second abutment means and said second races, and clamp means on said other member clamping said second abutment means thereto with said load element means between said second abutment means and the said second races of said bearings, each said load element being axially compressible at a predetermined force thereby to impart a predetermined axial load on each said bearing when the load element means are axially compressed.

2. A combination according to claim 1 in which each load element means comprises at least one ring convoluted in axial cross section and formed of a work hardening metallic material, each ring when subjected to an axial compressing force deforming resiliently up to a predetermined amount of axial compression and deforming plastically under substantially the same axial force upon further axial compression and springing back the amount of the resilient compression when the axial compressing force is released.

3. A combination according to claim 1 in which each load element means is in the form of a plurality of rings in coaxial nested relation, each ring being convoluted in axial cross section and formed of a work hardening metallic material, each ring when subjected to an axial compressing force deforming resiliently up to a predetermined amount of axial compression and deforming plastically under substantially the same axial force upon further axial compression and springing back the amount of the resilient compression when the axial compressing force is released.

4. A combination according to claim 1 in which at least one said load element means is in the form of a ring of sintered powdered metal having a density substantially less than theoretical density.

5. A combination according to claim 1 in which each of said load element means is in the form of a ring of sintered powdered metal having a density substantially less than theoretical density.

6. A combination according to claim 1 in which said clamp means comprises a clamp element adapted to be fixed to said other member to confine said second abutment means between said load element means and said clamp element, and means for first fixing said clamp element to said other member in a first axial position in which both of said load element means are in a state of plastic deformation and for thereafter fixing said clamp element to said other member in a second axial position spaced axially farther from said second races than when the clamp element was in said first axial position.

7. A combination according to claim 6 in which said load element means are compressed into a state of resilient deformation when said clamp element is in said second axial position.

8. A combination according to claim 1 in which said second abutment means comprises sleeve means slidable on said second member and having shoulders facing said second races and between which shoulders and second races the said load element means are disposed.

9. A combination according to claim 8 in which said sleeve means comprise a pair of sleeves in tandem, each sleeve having one radial side engaging said second member and the other radial side engaging the adjacent radial side of a respective second race.

10. A combination according to claim 8 in which said sleeve means is a single sleeve member having one radial side slidably engaging said second member and on the other radial side slidably engaging the adjacent radial sides of said second races.

11. A combination according to claim 1 in which the first abutment means on said first member comprise shoulders thereon engaging said one axial side of said first races.

12. A combination according to claim 11 in which said shoulders are integral with said first member and said first races are of different diameters.

13. A combination according to claim 1 in which said first abutment means comprises sleeve means having one radial side engaging said first member and the other radial side engaging the adjacent radial side of said first races and having shoulders engaging the said one axial side of said first races, said first member comprising abutment means axially engaging said sleeve means and operable to sustain the thrust of said load element means on said bearings.

14. A combination according to claim 1 in which said bearings are radial thrust bearings.

15. A combination according to claim 1 in which said bearings are thrust bearings, and a further radial bearing interposed between said members.

16. A method of providing for proportional preloading of tandem thrust sustaining antifriction bearings interposed between first and second members with each bearing having a race pertaining to each member which comprises; providing stationary abutment means on one of said members abutting one axial side of the pertaining races of the bearings, providing axially moveable abutment means on the other members disposed in opposed relation to the other axial sides of the other races of the bearings, placing a load element between said other race of each bearing and said moveable abutment means, said load elements when arranged in tandem and axially compressed by the application of an axial compressing force undergoing a first period of resilient deformation during which the compressing force increases substantially linearly followed by a second period of plastic deformation during which the compressing force remains substantially constant and equal on each load element and each load element springing back the amount of said resilient deformation upon release of said compressing force, moving said moveable abutment means toward said other races to a predetermined first axial position wherein said load elements are compressed to within the range of plastic deformation thereof, then moving said moveable abutment means away from said other races to a predetermined second axial position, and clamping the moveable abutment means to said other member in said second axial position.

17. The method according to claim 16 in which said load elements are confined between said moveable abutment means and said other races in a state of resilient compression when said second abutment means is in said second axial position.

18. The method according to claim 16 which includes interposing at least two rings in nested relation as a load element between said moveable abutment means and each said other race.

19. The method according to claim 15 which includes clamping said moveable abutment means to said other member by a clamp element which abuts said moveable abutment means from the opposite side that the moveable abutment means is abutted by said load elements, said clamping element having first and second predetermined axial positions on said other member, said clamp element in said first position compressing said load elements axially at least to the point of plastic deformation thereof, and in said second position compressing said load elements axially within the range of resilient deformation thereof.

20. In combination; a pair of relatively rotatable members, a pair of thrust sustaining antifriction bearings interposed in tandem between said members and having first races pertaining to one member and second races pertaining to the other member, at least one abutment on each member, said abutments in opposed relation and on opposite sides of said pair of bearings, and axially collapsible load element means serially arranged with said bearings between said abutments and operable to divide thrust loads between said bearings, each load element means comprising at least one ring convoluted in axial cross section and formed of a work hardening metallic material, each ring when subjected to an axial compressing force deforming resiliently up to a predetermined amount of axial compression and deforming plastically under substantially the same axial force upon further axial compression and springing back the amount of the resilient compression when the axial compressing force is released.

21. The combination according to claim 20 in which one abutment engages one end of one race of one bearing and the other abutment engages the other end of the other race of the other bearing and said load element means comprises a first load element interposed between the first races of the bearings and a second load element interposed between the second races of the bearings.

22. The combination according to claim 21 in which said bearings are disposed to sustain thrust in the same direction.

23. The combination according to claim 20 in which said bearings are of different size, and ring members interposed between corresponding races of said bearings in serial arrangement with said load element means.

24. The combination according to claim 23 in which each ring member is slidably supported as a respective one of said pair of members.

25. The combination according to claim 23 in which each ring member has one of the radially inner and outer sides slidably engaging a respective one of said pair of members and the other radial side notched and engaging one radial side and an end of one race of a respective bearing.

26. The combination according to claim 25 in which the other end of the other race of each bearing engages a respective one of said abutments.

27. The combination according to claim 23 in which each of said load element means has a stiffness in conformity with the size of the bearing pertaining thereto.

28. The combination according to claim 23 in which said bearings are substantially coplanar.

* * * * *